United States Patent
Thornburgh

(10) Patent No.: US 10,178,431 B2
(45) Date of Patent: Jan. 8, 2019

(54) HYBRID STREAM DELIVERY

(71) Applicant: Adobe Systems Incorporated, San Jose, CA (US)

(72) Inventor: Michael C. Thornburgh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/444,932

(22) Filed: Jul. 28, 2014

(65) Prior Publication Data

US 2016/0029050 A1    Jan. 28, 2016

(51) Int. Cl.
| | |
|---|---|
| H04N 21/44 | (2011.01) |
| H04L 29/06 | (2006.01) |
| H04N 21/45 | (2011.01) |
| H04N 21/81 | (2011.01) |
| H04N 21/433 | (2011.01) |
| H04N 21/858 | (2011.01) |
| H04N 21/6405 | (2011.01) |
| H04L 29/08 | (2006.01) |

(52) U.S. Cl.
CPC ... *H04N 21/44016* (2013.01); *H04L 65/4076* (2013.01); *H04N 21/4331* (2013.01); *H04N 21/4532* (2013.01); *H04N 21/6405* (2013.01); *H04N 21/812* (2013.01); *H04N 21/858* (2013.01); *H04L 67/02* (2013.01)

(58) Field of Classification Search
None
See application file for complete search history.

(56) References Cited

U.S. PATENT DOCUMENTS

| | | |
|---|---|---|
| 5,414,455 A | 5/1995 | Hooper et al. |
| 5,442,390 A | 8/1995 | Hooper et al. |
| 5,455,865 A | 10/1995 | Perlman |
| 5,857,072 A | 1/1999 | Crowle |
| 6,330,671 B1 | 12/2001 | Aziz |
| 6,363,416 B1 | 3/2002 | Naeimi et al. |
| 6,876,952 B1 | 4/2005 | Kappler et al. |
| 7,035,214 B1 | 4/2006 | Seddigh et al. |
| 7,133,922 B1 | 11/2006 | She et al. |
| 7,304,948 B1 | 12/2007 | Ong |

(Continued)

OTHER PUBLICATIONS

"Advisory Action", U.S. Appl. No. 13/285,904, dated Mar. 20, 2014, 4 pages.

(Continued)

*Primary Examiner* — Fernando Alcon
(74) *Attorney, Agent, or Firm* — Wolfe-SBMC

(57) ABSTRACT

Hybrid stream delivery techniques are described. In one or more implementations, a multicast stream of primary content is received at a computing device for output by the computing device. Timing information in the multicast stream is identified indicating when a break in the primary content is to occur. Responsive to the identification and before output of the primary content attains to the break, supplemental content is requested by the computing device that is available via a single dedicated stream. The supplemental content received via the single dedicated stream is cached during output of the primary content and the cached supplemental content is output upon completion of the output of the primary content up to the break.

20 Claims, 11 Drawing Sheets

(56) References Cited

U.S. PATENT DOCUMENTS

| | | | |
|---|---|---|---|
| 7,525,965 B1 * | 4/2009 | St Pierre | H04L 12/1854 370/390 |
| 7,657,644 B1 | 2/2010 | Zheng | |
| 7,882,207 B1 | 2/2011 | Titmuss et al. | |
| 8,171,147 B1 | 5/2012 | Kaufman et al. | |
| 8,341,688 B2 | 12/2012 | Ngo et al. | |
| 8,380,721 B2 | 2/2013 | Attaran et al. | |
| 8,392,530 B1 | 3/2013 | Manapragada et al. | |
| 9,066,115 B1 * | 6/2015 | Cherry | H04N 21/2668 |
| 9,066,138 B1 * | 6/2015 | Kraiman | H04N 21/458 |
| 9,591,069 B2 | 3/2017 | Thornburgh | |
| 2001/0037256 A1 | 11/2001 | Yazawa | |
| 2002/0029256 A1 | 3/2002 | Zintel et al. | |
| 2002/0143944 A1 | 10/2002 | Traversat et al. | |
| 2002/0150048 A1 | 10/2002 | Ha et al. | |
| 2003/0046336 A1 | 3/2003 | D'Annunzio et al. | |
| 2003/0063564 A1 | 4/2003 | Ha et al. | |
| 2003/0088696 A1 | 5/2003 | McCanne | |
| 2003/0191828 A1 | 10/2003 | Ramanathan et al. | |
| 2003/0233540 A1 | 12/2003 | Banerjee et al. | |
| 2004/0081125 A1 | 4/2004 | Ranta-Aho et al. | |
| 2004/0098502 A1 | 5/2004 | Xu et al. | |
| 2004/0162871 A1 | 8/2004 | Pabla et al. | |
| 2004/0193461 A1 | 9/2004 | Keohane et al. | |
| 2004/0196785 A1 | 10/2004 | Janakiraman et al. | |
| 2005/0041634 A1 | 2/2005 | Aura | |
| 2005/0163050 A1 | 7/2005 | Hopkins | |
| 2006/0029093 A1 * | 2/2006 | Van Rossum | G06F 17/30017 370/432 |
| 2006/0039285 A1 | 2/2006 | Chapman et al. | |
| 2006/0047831 A1 | 3/2006 | Piper | |
| 2006/0053209 A1 | 3/2006 | Li | |
| 2006/0167855 A1 | 7/2006 | Ishikawa et al. | |
| 2006/0168320 A1 | 7/2006 | Kidd et al. | |
| 2006/0173940 A1 | 8/2006 | Guntupalli et al. | |
| 2006/0250999 A1 | 11/2006 | Zeng et al. | |
| 2006/0251011 A1 | 11/2006 | Ramakrishnan et al. | |
| 2007/0070906 A1 | 3/2007 | Thakur | |
| 2007/0079327 A1 | 4/2007 | Khoo et al. | |
| 2007/0091934 A1 | 4/2007 | Myles et al. | |
| 2007/0171927 A1 | 7/2007 | Paik et al. | |
| 2007/0201502 A1 | 8/2007 | Abramson | |
| 2007/0220552 A1 | 9/2007 | Juster et al. | |
| 2007/0223379 A1 | 9/2007 | Sivakumar et al. | |
| 2007/0226365 A1 | 9/2007 | Hildreth et al. | |
| 2007/0244982 A1 * | 10/2007 | Scott, III | H04N 5/44543 709/217 |
| 2007/0250590 A1 | 10/2007 | Flannery et al. | |
| 2007/0282905 A1 | 12/2007 | Karlberg | |
| 2007/0288638 A1 | 12/2007 | Vuong et al. | |
| 2008/0049607 A1 | 2/2008 | Xu | |
| 2008/0072264 A1 | 3/2008 | Crayford | |
| 2008/0134266 A1 | 6/2008 | Kang | |
| 2008/0189429 A1 | 8/2008 | DaCosta | |
| 2008/0205394 A1 | 8/2008 | Deshpande et al. | |
| 2008/0294788 A1 | 11/2008 | Wu et al. | |
| 2008/0301315 A1 | 12/2008 | Cheng et al. | |
| 2009/0019174 A1 | 1/2009 | Ehn et al. | |
| 2009/0063975 A1 | 3/2009 | Bull | |
| 2009/0077254 A1 | 3/2009 | Darcie et al. | |
| 2009/0094639 A1 * | 4/2009 | Haberman | G06Q 30/0251 725/34 |
| 2009/0285096 A1 | 11/2009 | Yousef | |
| 2009/0287826 A1 | 11/2009 | Kaufman et al. | |
| 2010/0057928 A1 | 3/2010 | Kapoor et al. | |
| 2010/0067518 A1 | 3/2010 | Kaufman et al. | |
| 2010/0226250 A1 | 9/2010 | Plamondon | |
| 2010/0260191 A1 | 10/2010 | Hiie et al. | |
| 2010/0284389 A1 | 11/2010 | Ramsay et al. | |
| 2011/0029649 A1 | 2/2011 | Tian et al. | |
| 2011/0246608 A1 | 10/2011 | Wu et al. | |
| 2012/0054818 A1 | 3/2012 | Noh et al. | |
| 2012/0324090 A1 | 12/2012 | Gu et al. | |
| 2013/0003732 A1 | 1/2013 | Dholakia et al. | |
| 2013/0110981 A1 | 5/2013 | Thornburgh et al. | |
| 2013/0246578 A1 * | 9/2013 | Moreman | H04L 67/2842 709/219 |
| 2013/0290555 A1 * | 10/2013 | Einarsson | G06F 17/30017 709/231 |
| 2014/0068690 A1 * | 3/2014 | Luthra | H04N 21/4363 725/110 |
| 2014/0150019 A1 * | 5/2014 | Ma | G06Q 30/0251 725/34 |
| 2015/0128170 A1 * | 5/2015 | Fu | H04N 21/23439 725/32 |

OTHER PUBLICATIONS

"Final Office Action", U.S. Appl. No. 13/285,904, dated Dec. 19, 2013, 19 pages.

"HTTP Dynamic Streaming on the Adobe Flash Platform", Adobe Flash Platform Technical White Paper, Adobe Systems Inc., Sep. 2010, 18 pages.

"Move Adaptive Stream", Move Networks, Inc., retrieved from <http://www.movenetworks.com/wp-content/uploads/move-adaptive-stream.pdf> on Aug. 29, 2008 and accessed from Internet Archive WayBackMachine (https://archive.org/web/) on Jun. 19, 2014, 4 pages.

"Move Media Player", Move Networks, Inc., retrieved from <http://www.movenetworks.com/wp-content/uploads/move-media-player.pdf> on Aug. 29, 2008 and accessed from Internet Archive WayBackMachine (https://archive.org/web/) on Jun. 19, 2014, 3 pages.

"Move Networks Solutions", Move Networks, Inc., retrieved from <http://www.movenetworks.com/why-move/solutions> on Aug. 29, 2008 and accessed from the Internet Archive WayBackMachine (https://archive.org/web/) on Jun. 19, 2014, 3 pages.

"Non-Final Office Action", U.S. Appl. No. 13/285,904, dated May 24, 2013, 15 pages.

"Our Clients", Move Networks, Inc., retrieved from <http://www.movenetworks.com/why-move/our-clients> on Aug. 29, 2008 and accessed from the Internet Archive WayBackMachine (https://archive.org/web/) on Jun. 19, 2014, 1 page.

"Real-Time Media Flow Protocol Frequently Asked Questions—External", retrieved from <http://download.macromedia.com/pub/labs/flashplayer10/flashplayer10_rtmfp_faq_070208.pdf> on May 8, 2009 and accessed from <https://www.interlake.net/en/assets/File/flashplayer10_rtmfp_faq_081010.pdf> on Jun. 19, 2014, Jul. 2, 2008, 5 pages.

Allman, "RFC 2581: TCP Congestion Control", retrieved from <http://tools.ietf.org/html/rfc2581> on Jun. 19, 2014, Apr. 1999, 14 pages.

Birney, "Intelligent Streaming", Microsoft Corporation, retrieved from <http://www.microsoft.com/windows/windowsmedia/howto/articles/intstreaming.aspx?pf=true> on Aug. 29, 2008, May 2003, 7 pages.

Crowcroft, et al.,' "MAPEX: Application Level Multicast Architectural Requirements for APEX", retrieved from <URL:http://ftp.ist.pt/pub/drafts/draft-crowcroft-apex-multicast-01.txt> on Dec. 12, 2008 and accessed from <http://tools.ietf.org/html/draft-crowcroft-apex-multicast-01> on Jun. 19, 2014, Oct. 2, 2001, 9 pages.

IXIA, "Support: Enpoint Library", retrieved from <http://www.ixiacom.com/support/endpoint_library> on Jun. 19, 2014, 2 pages.

Kaufman, et al.,' "Network Multicast Peer Discovery Methods", U.S. Appl. No. 12/485,821, Jun. 16, 2009, 31 pages.

Kaufman, et al.,' "Self Organizing Peer-to-Peer System, Method, and/or Apparatus", U.S. Appl. No. 11/969,186, Jan. 3, 2008, 25 pages.

Narten, et al.,' "Neighbor Discovery for IP Version 6 (IPv6)", IETF Network Working Group, Dec. 1998, 87 pages.

Plummer, "An Ethernet Address Resolution Protocol—or—Converting Network Protocol Addresses to 48.bit Ethernet Address for Transmission on Ethernet Hardware", RFC 826, retrieved from <https://tools.ietf.org/rfc/rfc826.txt> on Jun. 19, 2014, Nov. 1982, 14 pages.

Postel, "User Datagram Protocol", Identified as page ftp://ftp.isi.edu/in-notes/rfc768.txt, Aug. 28, 1980, 3 pages.

(56) References Cited

OTHER PUBLICATIONS

Sano, et al.,' "Improving Efficiency of Application-Level Multicast with Network Support", Abstract Only, retrieved from <URL: http://cat.inist.fr/?aModele=afficheN&cpsidt=15670193> on Dec. 12, 2008 and accessed from <http://link.springer.com/chapter/10.1007/978-3-540-39405-1_2> on Jun. 19, 2014, 2003, 5 pages.

Wikipedia, "Communication Endpoint", retrieved from <http://en.wikipedia.org/wiki/Communication_endpoint> on Jun. 19, 2014, 1 page.

"Non-Final Office Action", U.S. Appl. No. 13/285,904, dated Apr. 22, 2015, 17 pages.

"Final Office Action", U.S. Appl. No. 13/285,904, dated Nov. 17, 2015, 19 pages.

"Non-Final Office Action", U.S. Appl. No. 13/285,904, dated Jun. 9, 2016, 20 pages.

"Notice of Allowance", U.S. Appl. No. 13/285,904, dated Jan. 17, 2017, 10 pages.

\* cited by examiner

HYBRID STREAM DELIVERY

BACKGROUND

Multicasting is a technique for group communication that employs a one to many approach to communication. For example, a network infrastructure may be configured such that a single packet sent by a content provider is automatically provided to each computing device that subscribes to a multicast stream. In this way, a content provider may send once and have the content streamed to a variety of computing devices automatically by leveraging the network infrastructure, which may help to conserve resources of the content provider.

However, as multicast is a "one to many" approach each user that subscribes to a conventional multicast receives the same content. Although this may result in improved efficiency as described above, this may also limit other functionality from being available to a user. For example, conventional multicasting techniques may preclude the sending of targeted advertisements to individual ones of the computing devices, may limit navigation through the stream of content, and so on.

SUMMARY

Hybrid stream delivery techniques are described. In one or more implementations, a multicast stream of primary content is received at a computing device for output by the computing device. Timing information in the multicast stream is identified indicating when a break in the primary content is to occur. Responsive to the identification and before output of the primary content attains to the break, supplemental content is requested by the computing device that is available via a single dedicated stream. The supplemental content received via the single dedicated stream is cached during output of the primary content and the cached supplemental content is output upon completion of the output of the primary content up to the break.

In one or more implementations, content is received at a computing device via a multicast stream. The content is reconfigured by the computing device for availability as a single dedicated stream according to a manifest. The reconfigured content is exposed as the single dedicated stream by the computing device in compliance with the manifest to one or more applications that are also executed on the computing device such that the one or more applications are not aware that the content is received at the computing device via the multicast stream.

In one or more implementations, a system includes one or more modules implemented at least partially in hardware. The one or more modules are configured to perform operations including exposing one or more controls that are selectable by a user to initiate one or more inputs to navigate content received via a multicast stream. Responsive to receipt of the inputs to navigate the content received via the multicast stream, a point in time is identified in the output of the content that corresponds to the navigation, a single dedicated stream is located that corresponds to the identified point in time, and the single dedicated stream is obtained for output.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
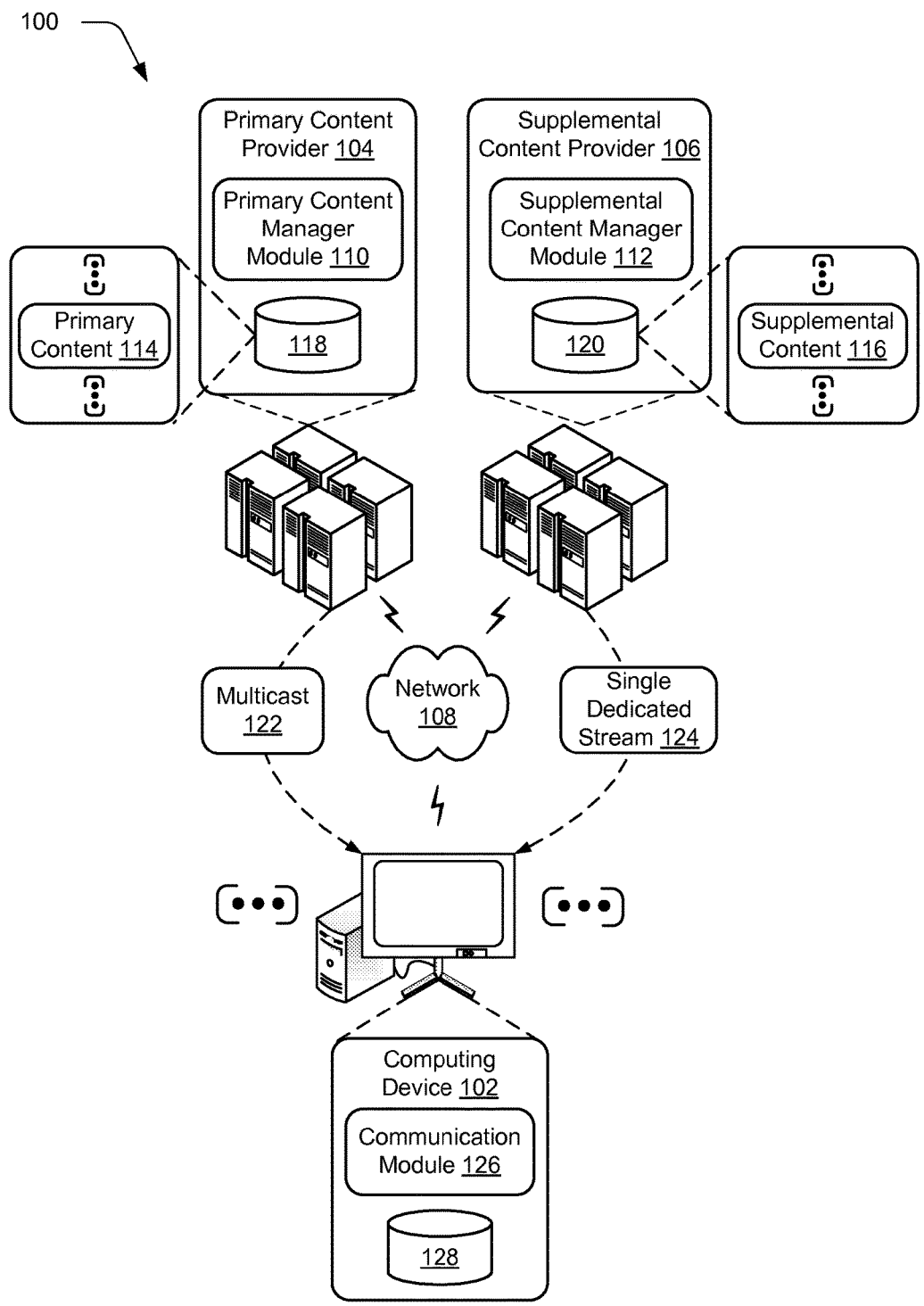
FIG. 1 is an illustration of an environment in an example implementation that is operable to employ the hybrid stream delivery techniques described herein.

Multicasting, which may be performed via native network and peer-to-peer, may be used to improve the efficiency of live media streaming, both in terms of load on servers and on shared network links. However, as previously described this may preclude desirable functionality such as targeted advertisements, navigation through the stream of content, and so on. For example, a user may not be able to "fast forward" or "jump" between different points in time in the output of the content in a conventional multicast stream as each of the individual computing devices receives the same stream of content via the multicast.

Hybrid stream delivery techniques are described. In one or more implementations, content is provided via a multicast stream. For example, an Internet Service Provider (ISP) may control a network infrastructure that is configured to provide a multicast stream of primary content (such as video, music, image slideshow, a television program, or other media) from a content provider to users that subscribe to the stream.

The network infrastructure may also be configured to support use of a single dedicated stream of supplemental content to individual computing devices and therefore provide a hybrid unicast/multicast system. Examples of use of a single dedicated stream include HTTP Dynamic Streaming (HDS) by Adobe®, HTTP Live Streaming (HLS) by Apple®, and others. These solutions leverage existing Internet infrastructure and strengths to deliver live streams in small, cache-friendly chunks. Using these techniques, each consumer/subscriber may receive a separate copy of the stream. Accordingly, these formats and delivery methods are inherently end-to-end. The dedicated end-to-end streams are thus described as "single" and "dedicated" in the sense that the streams are configured for receipt by a single computing device.

The supplemental content sent via the single dedicated stream may take a variety of forms to support a variety of different functionality. For example, the supplemental content may be configured as targeted advertisements that may be output during breaks in the multicast stream by leveraging the single dedicated stream. A computing device, for instance, may examine timing information to determine when a break is to occur and during output of the primary content received via the multicast, obtain and cache supplemental content (e.g., the targeted advertisement) for output during the break in the primary content. During the break, the multicast stream may be configured to go into a "sleep" mode to conserve network and computing device resources. In this way, the computing device may obtain targeted advertisements and yet efficiency of a multicast may be leveraged, further discussion of which may be found in relation to FIGS. 2-6.

The supplemental content may also be configured to support navigation performed in relation to the multicast stream. For example, the supplemental content may be downloaded, cached, and output in response to a request to initiate an output of content, such as a television program. During this output, the computing device may also subscribe to and cache the primary content (the television program also) for output. In this way, an amount of time involved in output of the content may be reduced by employing a hybrid multicast/single dedicated stream approach, further discussion of which may be found in relation to FIGS. 7-8.

In another example, the navigation may involve accessing different portions of a content that is streamed via a multicast. A user, for instance, may output primary content received via a multicast stream, such as a video stream. The user, during this output, may then desire to access different portions of the stream, such as to perform slow motion, rewind, fast forward, "jump" to a different point in time in the output, and so on. The user, therefore, may interact with a control to indicate this functionality and in response, may receive supplemental content via a single dedicated stream. The single dedicated stream may be configured to provide the desired user experience by interacting with the supplemental content, such as to provide slow motion playback, support rewind and/or fast forward, "jump" to a different point in time in the output, and so on. Thus, as before the advantages of a multicast stream may be leveraged without conventional drawbacks by employing a hybrid approach that also leverages a single dedicated stream, further discussion of which may be found in relation to FIGS. 9-10.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the hybrid stream delivery techniques described herein. The illustrated environment 100 includes a computing device 102, a primary content provider 104, and a supplemental content provider 106 that are communicatively coupled, one to another, via a network 108. The computing device 102 is illustrated as one of a plurality of different examples of devices that may receive content from the content providers, i.e., client devices. Computing devices that implement computing device 102 as well as the primary and supplemental content providers 104, 106 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some instances, (e.g., computing device 102), the computing device may be representative of a plurality of different devices, such as multiple servers utilized by a business to perform operations "over the cloud" as illustrated for the primary and supplemental content providers 104, 106, further discussion of which may be found in relation to FIG. 11.

The primary and supplemental content providers 104, 106 are illustrated as including, respectively, a primary content manager module 110 and a supplemental content manager module 112 along with primary content 114 and supplemental content 116 that are available via respective storage 118, 120. The primary content manager module 110 is representative of functionality to communicate primary content 114 via a multicast stream 122 to a computing device 102 via the network 108. The primary content 114 may be configured in a variety of ways, such as a video, audio, television program, or other type of media or data that is configured for streaming via the network 108, e.g., as one or more packets. As previously described, the multicast 122 may support a "one to many" technique for communication of data via the network, such as by leveraging a network infrastructure, via a peer-to-peer configuration, and so on.

The supplemental content manager module 112 is representative of functionality to communicate supplemental content 116 via a single dedicated stream 124 (i.e., unicast) to the computing device 102 via the network 108. For example, the single dedicated stream 124 may be configured as a sequence of digital encoded data packets that are utilized to communicate data from storage 120 via the network 108. The data packets may then be decoded and consumed in sequence to recreate the source data, such as a television program, movie, music, sporting event, and so forth.

The single dedicated stream 124 employs an end-to-end configuration in which the stream is sent to the computing device 102, individually, that requested the supplemental content 116. One example of such a configuration is Hypertext Transfer Protocol (HTTP), examples of which include RFC 2616 that defines HTTP/1.1, RFC 7230-7235, and others.

The primary content 114 and supplemental content 116 may thus be received by a communication module 126 via the network 108 using a multicast 122 and single dedicated stream 124, respectively. This content may then be output for rendering, cached in storage 128 (e.g., using buffering techniques), stored in storage 128 for later output, and so on. The communication module 126 is representative of a variety of different functionality, such as a media player, operating system, network-enabled application, plug-in module, and so forth.

The environment 100 may be configured in a variety of ways. For example, although illustrated separately the primary content provider 104 and the supplemental content provider 106 may be combined as a single content provider, may be provided by separate entities (e.g., a content provider and an advertisement provider), and so on. Additionally, although the primary content 114 and the supplemental content 116 are illustrated separately these may share a common source, such as to support the navigation techniques described below.

In another example, the environment 100 may be representative of a network domain, a portion of a network (e.g., the Internet) serviced by a single Internet Service Provider (ISP), and so forth. Thus, in this way the environment 100 may control a network infrastructure and thus support multicast, which is not generally available via the Internet as a whole. A network domain may also describe a sub-network of computing devices that may be controlled by network administrators via security and permissions for each of the computing devices included in the domain, such as for an enterprise (e.g., a business), and so forth. Other sub-networks are also contemplated, such as workgroups, collections defined by a single Internet Service Provider (ISP) as described above, and so on.

Hybrid Stream Timing Information and Caching

Figure 4:
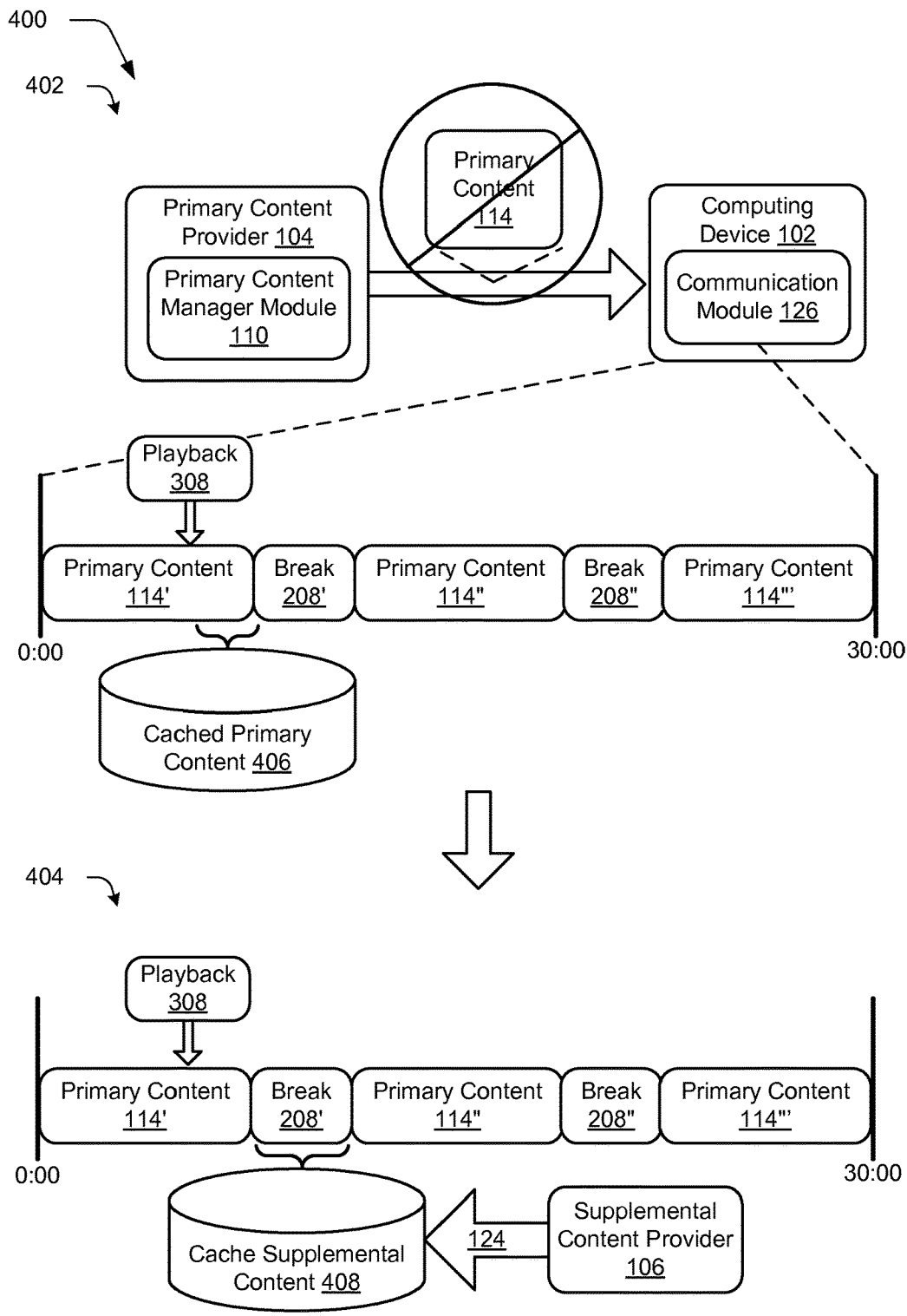
FIG. 4 depicts a system in an example implementation in which a computing device employs caching techniques and timing information to output primary and supplemental content.
Figure 5:
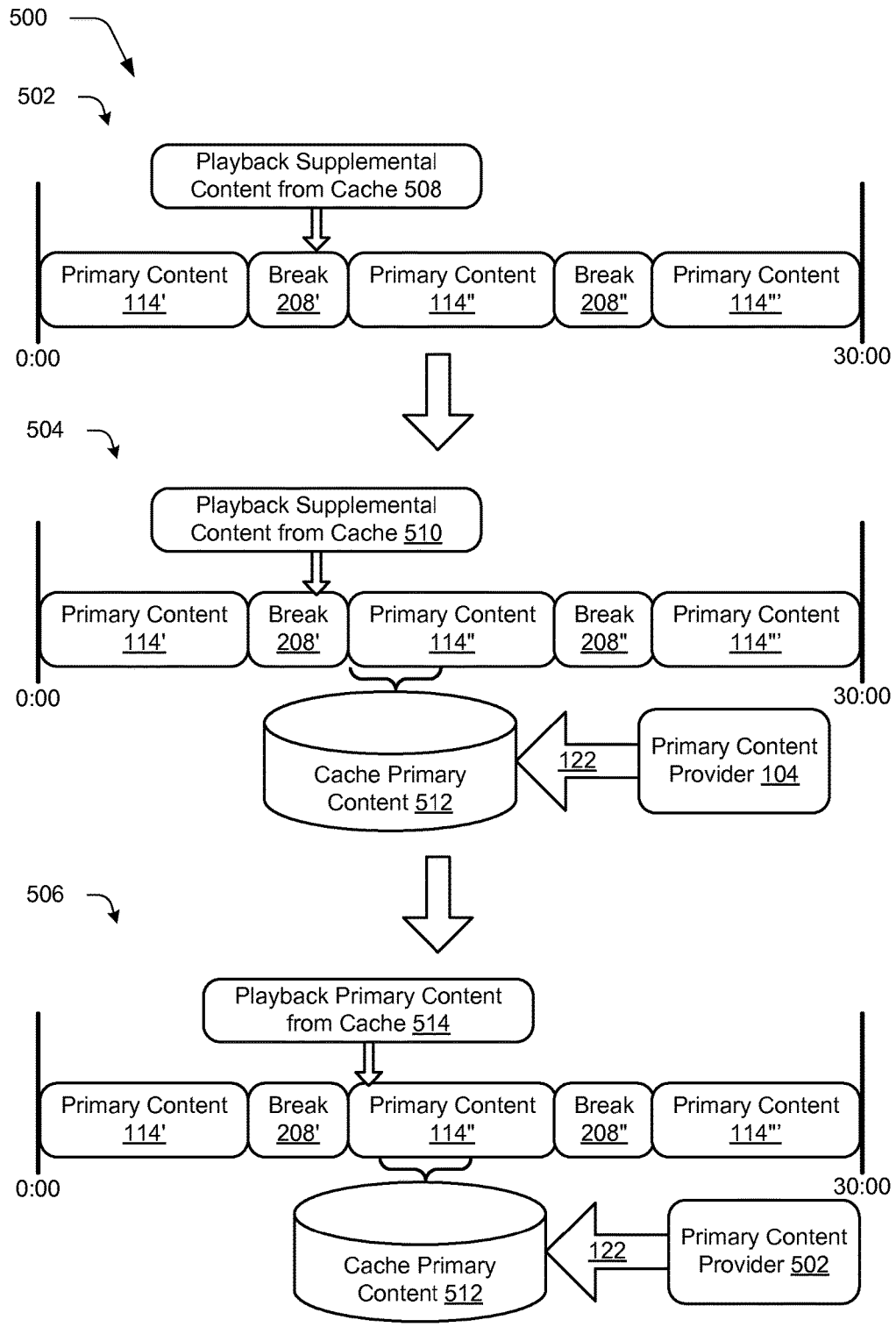
FIG. 5 depicts a system in an example implementation in which supplemental content is used to fill breaks in a multicast stream of data.
Figure 6:
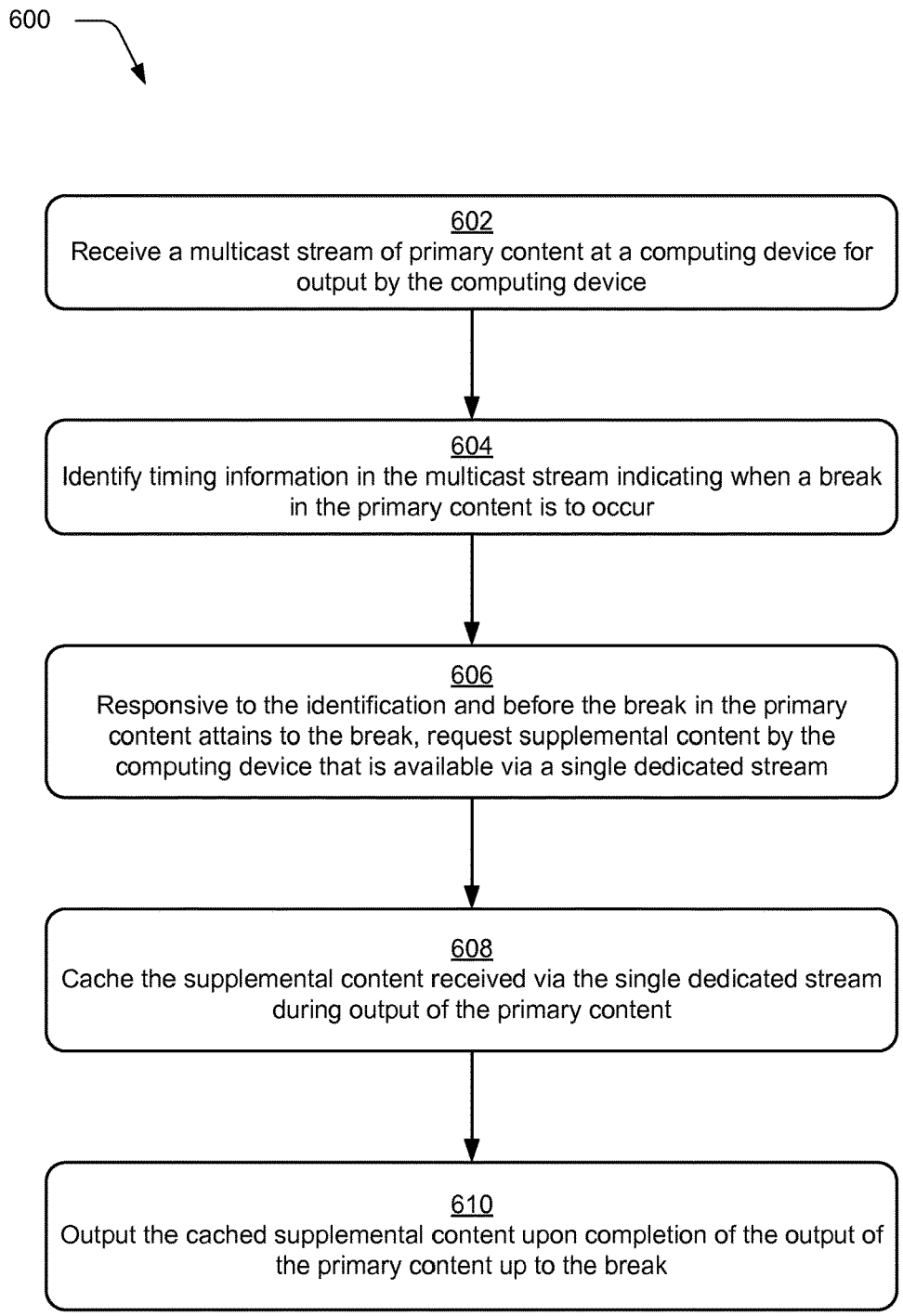
FIG. 6 is a flow diagram depicting a procedure in an example implementation in which hybrid stream timing information and caching techniques are described.

FIGS. 2-6 describe example systems 200, 300, 400, 500 and a procedure 600, respectively, in which hybrid stream timing information and caching techniques are described. FIG. 6 is a flow diagram that describes steps in a procedure in accordance with one or more embodiments. The procedure can be performed in connection with any suitable hardware, software, firmware, or combination thereof as further described in relation to FIGS. 1 and 11. In at least some embodiments, the procedure is performed, at least in part, by suitably-configured modules, such as a primary content manager module 110, a supplemental content manager module 112, and a communication module 126, and so on. As such, the following discussion refers to FIGS. 2-6 in the description of this example functionality.

Figure 2:
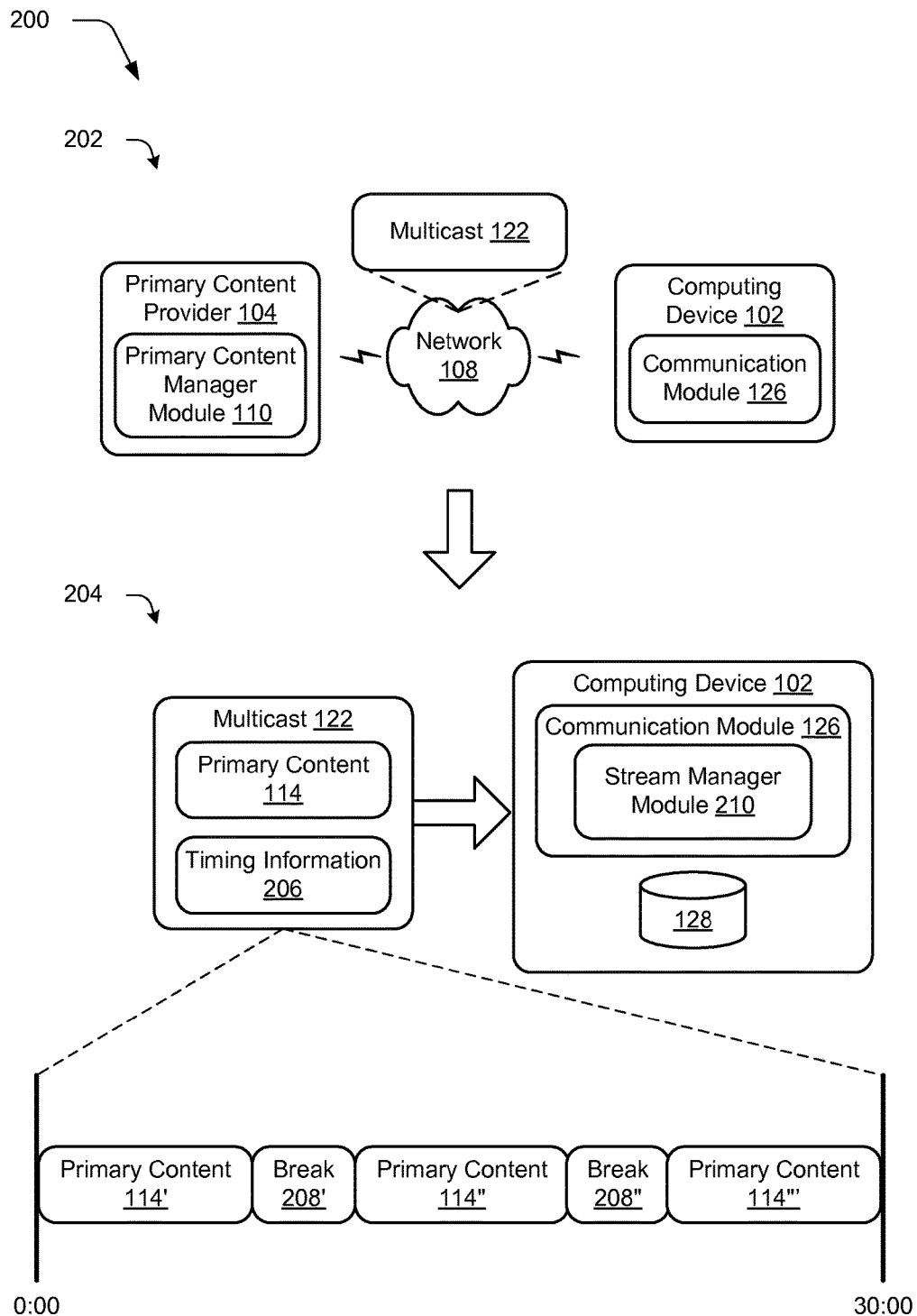
FIG. 2 depicts a system in an example implementation in which a computing device requests and receives a multicast of primary content that includes timing information for breaks in the multicast.

FIG. 2 depicts a system 200 in an example implementation in which a computing device requests and receives a multicast 122 of primary content 114 that includes timing information for breaks in the multicast 122. The system 200 is illustrated through the use of first and second stages 202, 204. At the first stage 202, a multicast stream 122 of primary content is received at a computing device 102 for output by the computing device (block 602 of FIG. 6). The computing device 102, for instance, includes a communication module 126 that is representative of functionality to communicate via a network, such as the network 108, to subscribe to a multicast 122 of content, such as a television program from a television provider, a dedicated application to receive video content via the Internet (e.g., YouTube®, Instagram®), and so forth.

At the second stage 204, an example configuration of the multicast 122 is shown. The multicast 122 includes primary content 114 (e.g., the television program or video of the previous example), which may be configured as a plurality of packets or other portioned content. The multicast 122 also includes timing information 206, which is configured to describe points in time in which part of the primary content 114, illustrated at primary content 114', 114", 114'" is to be output as well as one or more breaks 208', 208" in this output. Continuing with the previous example, for instance, the primary content 114', 114", 114'" may include packets of the television program while the breaks 208', 208" do not include these packets. Accordingly, the communication module 126 may include a stream manager module 210, which is representative of functionality in this example to identify the breaks 208', 208" in the output of the primary content 114', 114", 114'" which may then be filled with supplemental content, an example of which is further described in the following.

Figure 3:
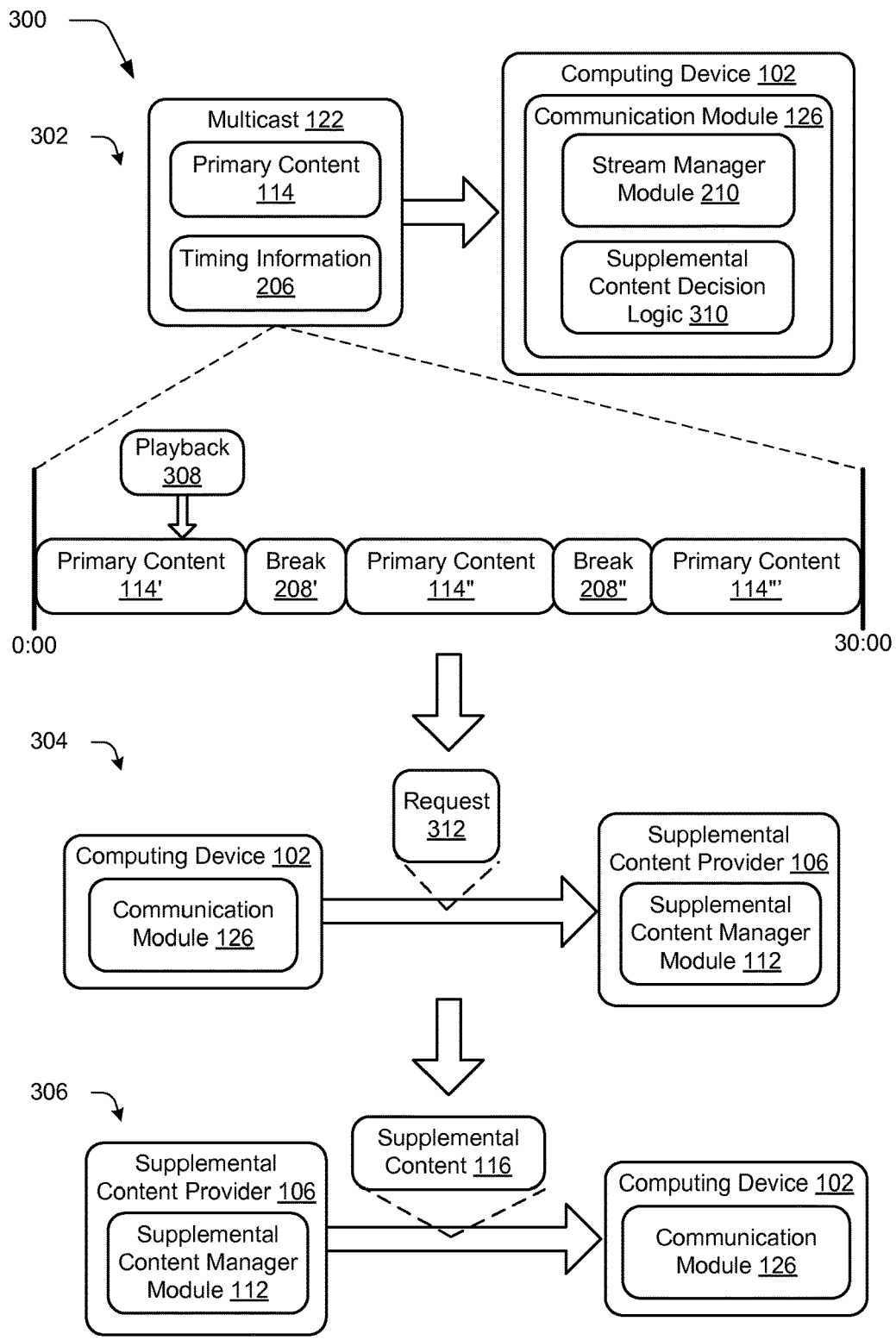
FIG. 3 depicts a system in an example implementation in which a computing device uses timing information to identify and fill breaks in a multicast using supplemental content obtained via a single dedicated stream.

FIG. 3 depicts a system 300 in an example implementation in which a computing device uses timing information 206 to identify breaks in a multicast during which to use supplemental content obtained via a single dedicated stream. The system 300 is illustrated through the use of first, second, and third stages 302, 304, 306. At the first stage 302, timing information in the multicast stream is identified that indicates when a break in the primary content is to occur (block 604 of FIG. 6). For example, the computing device may receive a multicast 122 that includes primary content 114 and timing information 206 as previously described. The stream manager module 210 of the communication module 126 of the computing device 102 examines the timing information 206 to determine when breaks 208', 208" in the output of the primary content 114 in the multicast 122 are to occur.

The timing information 206, for instance, may be configured to explicitly indicate when the breaks are to occur in a sequence of packets that are to be received by the computing device 102, e.g., may indicate a range of time in which primary content 114', 114", 114'" is not streamed by the primary content provider 104. In another example, this may be accomplished through use of timestamps and a manifest that indicates certain periods in a timeline that are to be used for breaks. Implicit techniques may also be employed, such as to identify breaks in collections of primary content 114', 114", 114'" based on the timestamps for packets in those collections and thus identify "missing" sections as the breaks 208', 208". For instance, primary content 114' may include timestamps indicating output between minutes 1 through 8 and primary content 114" may include timestamps indicating output between minutes 10-18. Accordingly, a break 208' may be identified between minutes 8-10 in this example. Other examples are also contemplated.

Identification of the breaks by the stream manager module 210 may then be leveraged by supplemental content decision logic 310 of the communication module 126 to "fill" the breaks 208', 208" with supplemental content. The supplemental content decision logic 310, for instance, may be representative of functionality that may select targeted advertisements for output during the breaks 208', 208". The selection may be made in a variety of ways, such as based on heuristics (e.g., monitored user interaction with the computing device 102 or other computing devices), user settings, user purchases made, browsing history, content that is local to the computing device 102 that is indicative of user preferences, and so forth.

The selection of the targeted advertisements may also include location of "where" the targeted advertisements, or other forms of supplemental content, are available, e.g., which network address. Accordingly, at the second stage 304, a request 312 is formed by the communication module 126 for communication via the network 108 of FIG. 1 to a supplemental content provider for supplemental content 116 located as part of the identifying. Continuing with the previous example, the request 312 may be formed to obtain parts of the supplemental content in accordance with HTTP, e.g., as specified in a manifest indicating network locations and corresponding parts of the supplemental content 116. In response, the supplemental content provider 106 may provide this supplemental content 116 to the computing device 102 as shown in the third stage 306. The requests and subsequent obtaining of the supplemental content 116 may be performed in a variety of ways, such as to leverage a buffer, an example of which is further described in the following and shown in corresponding figures.

FIG. 4 depicts a system 400 in an example implementation in which a computing device 102 employs caching techniques and timing information to output primary and supplemental content. The system 400 is illustrated through the use of first and second stages 402, 404 as above. At the first stage 402, a playback 308 of primary content 114' is performed from cached primary content 406. The computing device 102, for instance, may utilize storage 128 of FIG. 1 to buffer playback of the content.

The communication module 126, through use of the timing information 206 identified in the discussion of the previous figure, may determine that a break 208' is to occur in which the primary content is not to be streamed from the primary content provider 104 via the multicast 122. Accordingly, as shown in the second stage 404, responsive to the identification and before the break in the primary content occurs, supplemental content is requested by the computing device that is available via a single dedicated stream (block 606 of FIG. 6). The supplemental content received via the single dedicated stream is then cached during output of the primary content (block 608 of FIG. 6).

For example, buffering techniques may be utilized to "smooth" an output of the primary content 114, such as to avoid interruptions in a network connection and so forth. Accordingly, the computing device 102 may have an amount of cached primary content 406, which in this instance is illustrated through a bracket as corresponding to an amount of time in an output of primary content 114' before break 208'.

The primary content provider 104 may be configured to conserve network and processing resources by reducing and even eliminating a stream of the primary content 114 during the break 208'. Accordingly, this may free resources of the computing device 102 to cache supplemental content 408 from the supplemental content provider 106 received via a single dedicated stream 124 as shown in the second stage 404 during playback 308 of the cached primary content 406.

The single dedicated stream 124, for instance, may support downloads of the supplemental content at rates that are greater than rates at which the content is consumed during real-time playback, which may even be greater than a rate supported by the multicast. In this way, the cached supplemental content 408 may be completely received before playback of the primary content resumes and/or is no longer in the break period. By reducing network bandwidth consumption of the primary content during the break period, the supplemental content does not have to compete for download capacity with the primary content.

FIG. 5 depicts a system 500 in an example implementation in which supplemental content is used to fill breaks in a multicast stream of data. The system 500 is illustrated through the use of first, second, and third stages 502, 504, 506. At the first stage 502, the cached supplemental content is output upon completion of the output of the primary content from the cache that was received up to the break (block 610 of FIG. 6). For example, the computing device 102 may perform a playback of the supplemental content from cache 508 that was received via the single dedicated stream, e.g., HTTP.

During this playback of the supplemental content from the cache 510, a cache of primary content 512 may be collected from the primary content provider 104 via the multicast 122 as shown in the second stage 504. For example, the filling of the cache of supplemental content may be performed in a lesser amount of time than involved in the output of the supplemental content.

Accordingly, once sufficient supplemental content has been received to fill the break 208', and even subsequent breaks 208'' if sufficient time, the computing device 102 may begin caching the primary content 512 via the multicast 122. In this way, a smooth transition may be made between the output of the supplemental content and the primary content. The caching of the primary content 512 may continue during the playback of the primary content from cache 514 as shown in the third stage 506. In this way, seamless transitions may be supported between the output of the primary and supplemental content thereby enabling the environment 100 to avail itself of the efficiency of multicasts yet still provide other functionality that was otherwise not supported using conventional techniques.

Local Exposure of a Hybrid Stream by a Computing Device

Figure 7:
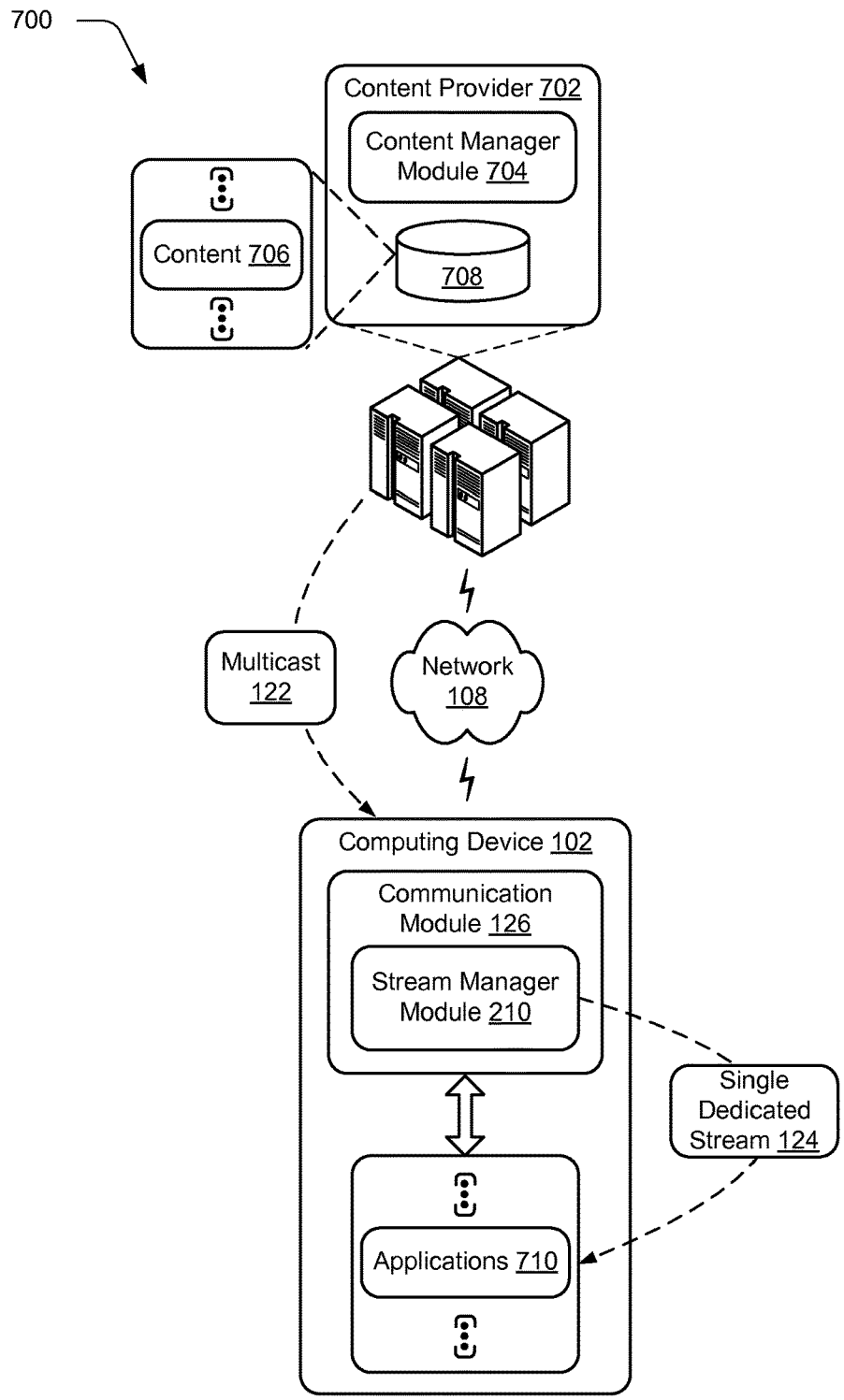
FIG. 7 depicts a system in an example implementation in which a computing device receives a multicast stream which is exposed to applications of the computing device as a single dedicated stream.
Figure 8:
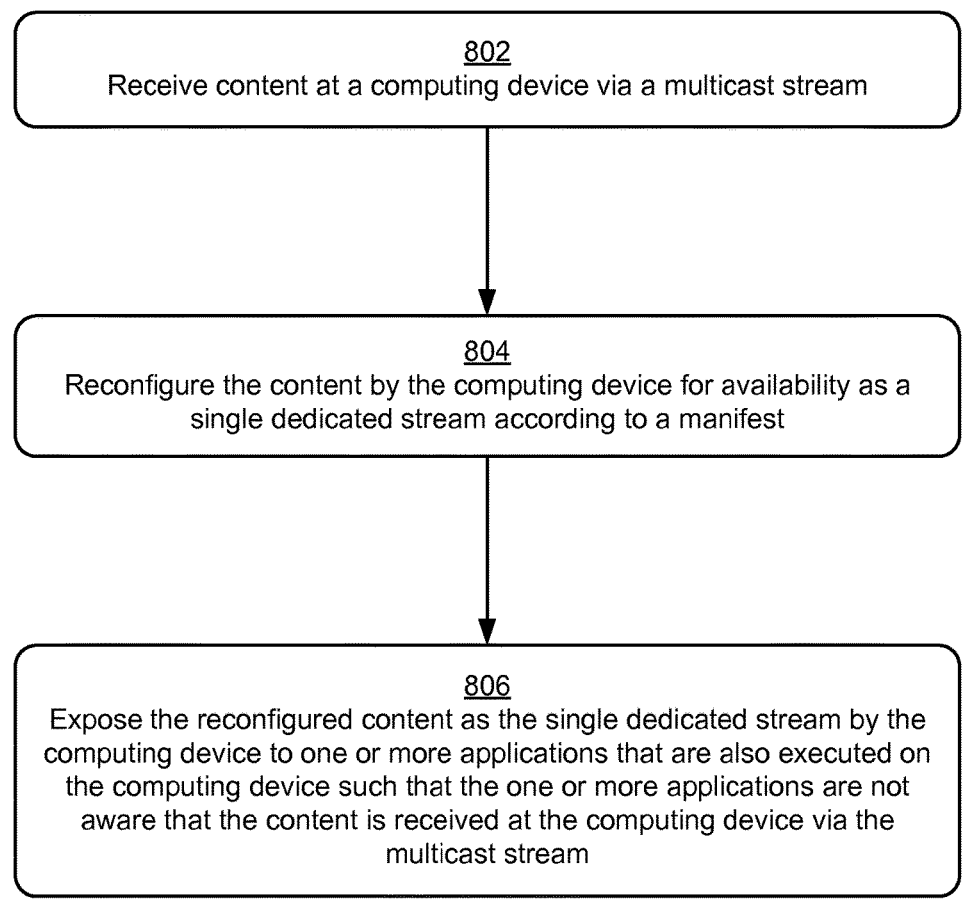
FIG. 8 is a flow diagram depicting a procedure in an example implementation in which a computing device receives a multicast stream which is exposed to applications of the computing device as a single dedicated stream.

FIGS. 7 and 8 describe an example system 700 and a procedure 800, respectively, in which a hybrid stream is exposed to applications of a computing device. FIG. 8 is a flow diagram that describes steps in a procedure 800 in accordance with one or more embodiments. The procedure 800 can be performed in connection with any suitable hardware, software, firmware, or combination thereof as further described in relation to FIGS. 1 and 11. In at least some embodiments, the procedure is performed, at least in part, by suitably-configured modules, such as a stream manager module 210. As such, the following discussion refers to FIGS. 7 and 8 in the description of this example functionality.

FIG. 7 depicts a system 700 in an example implementation in which the computing device receives a multicast stream which is exposed to applications of the computing device as a single dedicated stream. The system 700 includes the computing device 102 that is communicatively coupled to a content provider 702 via a network 108. The content provider includes a content manager module 704 that is representative of functionality to stream content 706 from storage 708 via the network 108 as a multicast 122.

The computing device 102 includes a communication module 126 having a stream manager module 210 as previously described. Although the stream manager module 210 is illustrated as part of the communication module 126, the stream manager module 210 may be implemented in a variety of ways, such as a standalone application, third-party plugin, as part of an operating system of the computing device 102, and so on.

Figure 11:
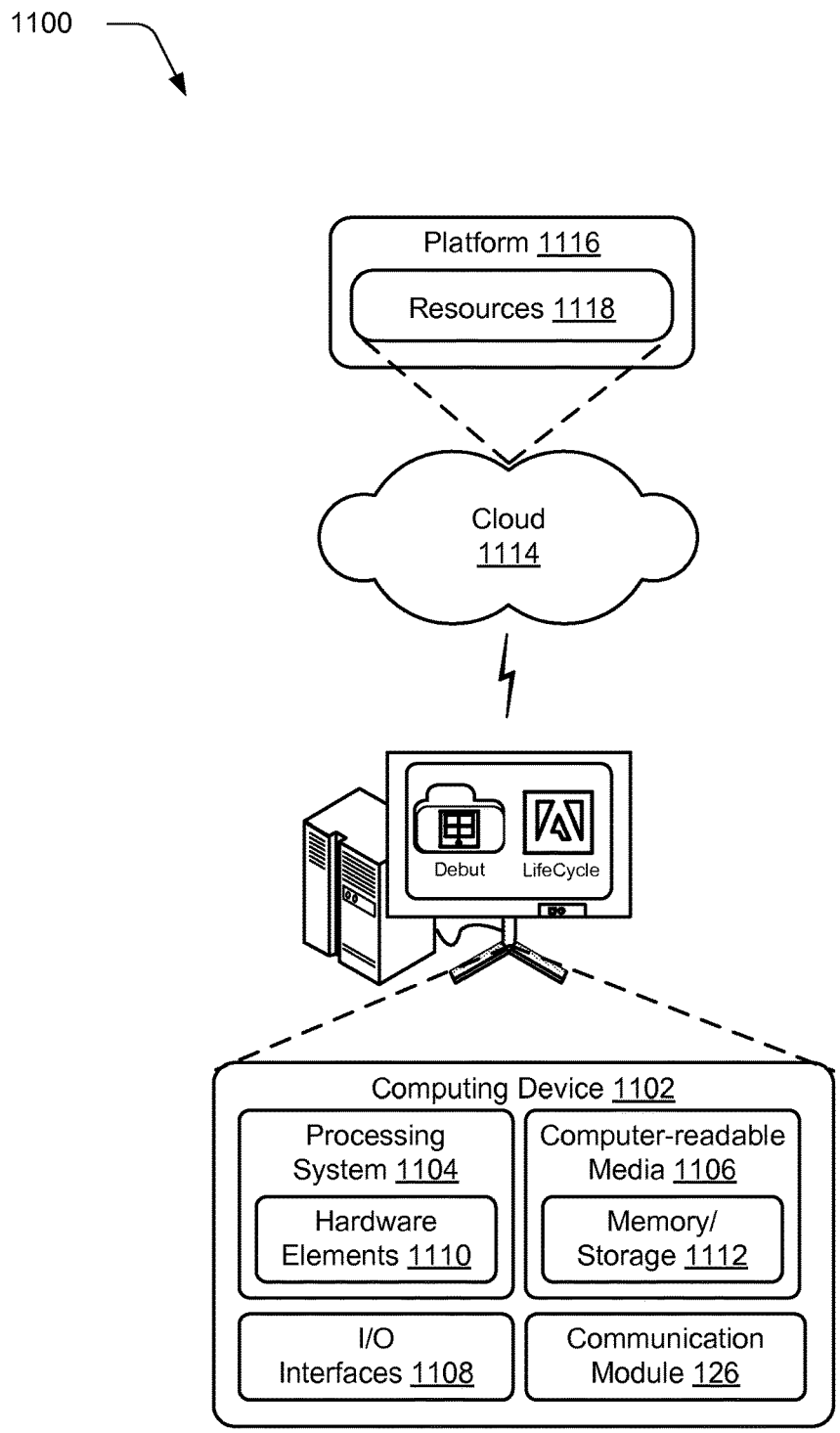
FIG. 11 illustrates an example system including various components of an example device that can be implemented as any type of computing device as described and/or utilized with reference to FIGS. 1-10 to implement embodiments of the techniques described herein.

The computing device 102 also includes applications 710 that are executable by the computing device, e.g., storable in a computer-readable storage medium and executable by one or more processors as described in relation to FIG. 11. In some instances, the applications 710 may not be configured to support processing of the multicast 122, i.e., are not compatible. For example, the applications 710 may be configured to receive single dedicated streams (e.g., HTTP) as this is the format generally supported over the Internet.

Accordingly, in this instance content is received at the computing device 102 via a multicast stream 122 (block 802 of FIG. 8). The content is then reconfigured by the computing device for availability as a single dedicated stream according to a manifest (block 804 of FIG. 8). The stream manager module 210, for instance, may generate a manifest, receive a preconfigured manifest, and so forth that describes where portions of a single dedicated stream 124 are available, e.g., network addresses such as URLs. The stream manager module 210 may then reconfigure the content 706 that is received via the multicast 122 for reception as a single dedicated stream 124 by making corresponding portions of the content 706 available via the indicated network addresses of the manifest.

The reconfigured content is then exposed by the computing device 102 as the single dedicated stream 124 to the one or more applications 710 that are also executed on the computing device 102 such that the one or more applications are not aware that the content is received by the computing device via the multicast 122 stream (block 806 of FIG. 8). Continuing with the previous example, the stream manager module 210 may expose the single dedicated stream 124 and thus "abstract away" the processing performed in the reconfiguration of the multicast 122 from the applications 710. In this way, applications 710 that are not compatible with the multicast 122 may still access a single dedicated stream 124 locally at the device and thus the computing device 102 and the system 700 as a whole may still avail itself of the efficiencies of the multicast 122. A variety of other examples are also contemplated without departing from the spirit and scope of the described techniques.

Hybrid Stream Navigation by a Computing Device

Figure 9:
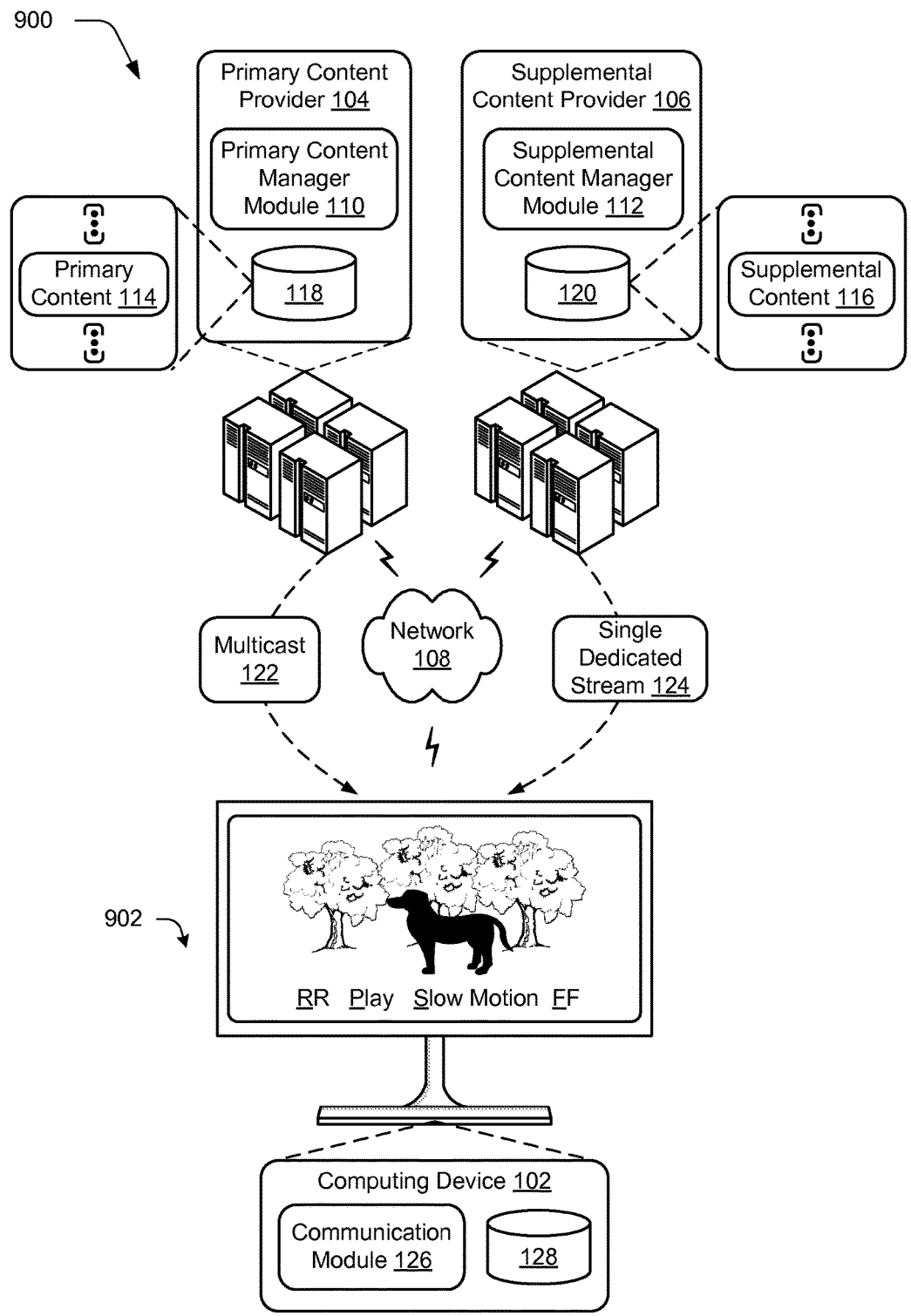
FIG. 9 depicts a system in an example implementation in which hybrid multicast/unicast techniques are employed to navigate content.
Figure 10:
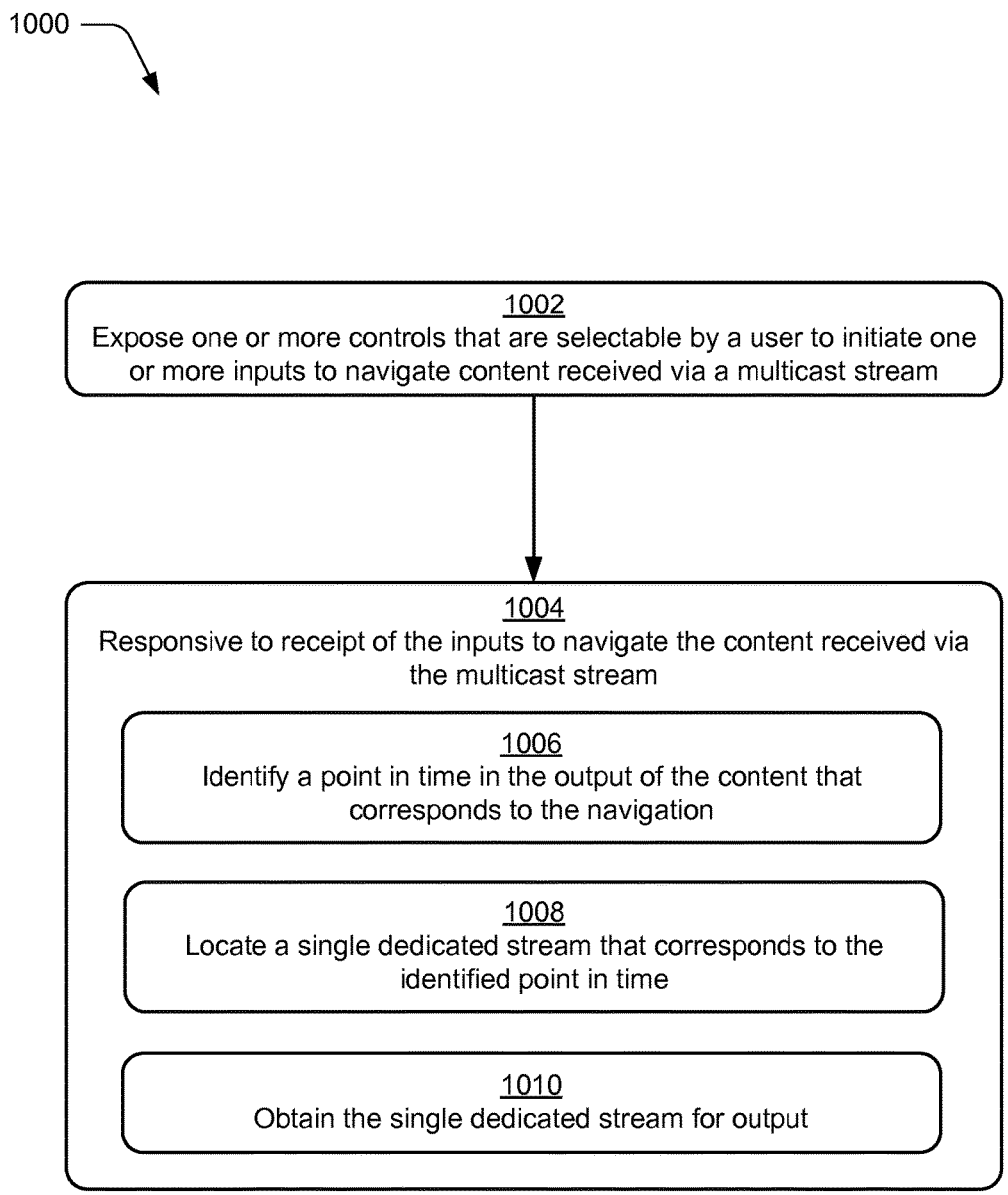
FIG. 10 is a flow diagram depicting a procedure in an example implementation in which hybrid multicast/unicast techniques are employed to navigate content.

FIGS. 9 and 10 describe an example system 900 and a procedure 1000, respectively, in which a hybrid stream is exposed to applications of a computing device. FIG. 9 is a flow diagram that describes steps in a procedure 900 in accordance with one or more embodiments. The procedure 900 can be performed in connection with any suitable hardware, software, firmware, or combination thereof as further described in relation to FIGS. 1 and 11. In at least some embodiments, the procedure is performed, at least in part, by suitably-configured modules, such as a primary content manager module 110, a supplemental content manager module 112, a communication module 126, and so on. As such, the following discussion refers to FIGS. 9 and 10 in the description of this example functionality.

FIG. 9 depicts a system 900 in an example implementation in which hybrid multicast/unicast techniques are employed to navigate content. Like FIG. 1, the system 900 includes the primary content provider and supplemental content provider 106 that are configured to provide respective primary content 114 and supplemental content 116 to the computing device 102 via the network 108. The primary content 114, for instance, may be configured as a television program, video, music, and so on as previously described.

One or more controls 902 are exposed that are selectable by a user to initiate one or more inputs to navigate content received via a multicast stream (block 1002 of FIG. 10). For example, the communication module 126 may support controls 902 that are selectable via a gesture, touch input, keyboard, cursor control device, speech input, and so on. Selection of the controls may be performed by a user to navigate content. This may include launching an output of the content (e.g., play) as well as navigating within a current output of content, e.g., rewind, fast forward slow motion playback, and so on.

Responsive to receipt of the inputs to navigate the content received via the multicast stream (block 1004 of FIG. 10), a point in time in the output of the content that corresponds to the navigation is identified (block 1006 of FIG. 10). Continuing with the previous example, the point in time for launching the playback of the content may correspond to the beginning of the content. Time codes may also be utilized, e.g., incrementing a current time code by a predefined amount to "jump" to a different point in the output of the content, and so on.

As previously described, however, a multicast 122 is a "one to many" approach and thus navigation using the multicast would affect each computing device that has subscribed to the multicast. Accordingly, the communication module 126 may be configured to locate a single dedicated stream that corresponds to the identified point in time (block 1008 of FIG. 10). The single dedicated stream is then obtained for output (block 1010 of FIG. 10), e.g., rendered for display by output devices of the computing device 102. For example, a user of the computing device 102 may select a "fast forward" control to fast forward an output of a television program. In response, the communication module 126 may then identify a point in time in the output of the content based on the selected control and obtain content corresponding to that point in time via a single dedicated stream 124 (e.g., HTTP) as supplemental content 116 from the supplemental content provider 106.

In this way, the supplemental content 116 may be used to support the navigation and interaction with the content. As previously described, this may also include improving a launch of the content, such as to obtain the supplemental content 116 via the single dedicated stream 124 for output while the computing device 102 subscribes to and obtains the content via the multicast 122, thereby improving a launch time of the content. A variety of other navigation examples are also contemplated.

Example System and Device

FIG. 11 illustrates an example system generally at 1100 that includes an example computing device 1102 that is representative of one or more computing systems and/or devices that may implement the various techniques described herein. This is illustrated through inclusion of the communication module 126, which may be configured to manage receipt of content via hybrid multicast/unicast techniques as previously described.

The computing device 1102 may be, for example, a server of a service provider, a device associated with a client (e.g., a client device), an on-chip system, and/or any other suitable computing device or computing system. The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, a multicast stream of primary content;
   displaying, by the computing device, the primary content of the multicast stream;
   identifying, by the computing device during the outputting of the primary content, timing information in the multicast stream indicating when a break in the displaying of the primary content is to occur;
   responsive to the identifying by the computing device and before reaching the break in the displaying of the primary content by the computing device, requesting supplemental content by the computing device that is available via a single dedicated stream, the requesting performed concurrently during the receiving and the displaying of the primary content via the multicast stream;
   receiving, by the computing device, the single dedicated stream concurrently during the receiving and the displaying of the multicast stream of the primary content by the computing device;
   caching, by the computing device, the supplemental content received via the single dedicated stream concurrently during the receiving and the displaying of the primary content by the computing device; and
   upon completion of the displaying of the primary content up to the break:
      reducing, by the computing device, network bandwidth consumption of the primary content; and
      displaying, by the computing device, the cached supplemental content.

2. A method as described in claim 1, wherein the supplemental content is an advertisement.

3. A method as described in claim 1, further comprising determining which supplemental content is to be obtained via the single dedicated stream by the computing device.

4. A method as described in claim 3, wherein the determination is made using information included in the multicast stream.

5. A method as described in claim 1, further comprising:
   reconfiguring the primary content received by the computing device via the multicast stream for availability as a single dedicated stream; and
   exposing the reconfigured primary content as the single dedicated stream by the computing device to one or more applications that are also executed on the computing device such that the one or more other applications are not aware that the primary content is received at the computing device via the multicast stream.

6. A method as described in claim 1, further comprising:
   exposing one or more controls that are selectable by a user to initiate one or more inputs to navigate primary content received via a multicast stream; and
   responsive to receipt of the inputs to navigate the primary content received via the multicast stream:
      identifying a point in time in the displaying of the primary content that corresponds to the navigation;
      locating a single dedicated stream that corresponds to the identified point in time; and
      obtaining the single dedicated stream for display.

7. A method as described in claim 1, wherein the single dedicated stream is configured in accordance with a hypertext transfer protocol (HTTP).

8. A method as described in claim 1, wherein the multicasting is performed as a network multicast that leverages infrastructure of the network to perform the multicasting of individual packets for receipt by a plurality of said computing devices.

9. A method as described in claim 1, wherein the multicasting is performed via a peer-to-peer network or a mesh network.

10. A method implemented by a computing device, the method comprising:
   receiving, by the computing device, primary content via a multicast stream;
   displaying, by the computing device, the primary content of the multicast stream;
   identifying, by the computing device concurrently during the displaying of the primary content from the multicast steam; timing information in the multicast stream indicating when a break period that does not include packets in the multicast stream in the primary content is to occur;
   requesting, by the computing device, supplemental content via a single dedicated stream concurrently during the displaying of the primary content of the multicast stream;

receiving, by the computing device, the single dedicated stream concurrently during the receiving and the displaying of the multicast stream of the primary content by the computing device;

replacing, by the computing device, the break period of the primary content with supplemental content received at the computing device via a single dedicated stream;

reconfiguring the primary content and the replacement supplemental content by the computing device for availability as a single dedicated stream according to a manifest;

exposing the reconfigured content as the single dedicated stream by the computing device in compliance with the manifest to one or more applications that are also executed on the computing device such that the one or more applications are not aware that the content is received at the computing device via the multicast stream; and displaying, by the computing device, the reconfigured content through execution of the one or more applications by the computing device.

11. A method as described in claim 10, wherein the reconfiguring into the single dedicated stream is performed in accordance with a Hypertext Transfer Protocol (HTTP).

12. A method as described in claim 10, wherein the manifest describes network locations of where portions of the single dedicated stream are available.

13. A method as described in claim 12, wherein the exposing is performed such that requests by the one or more applications for the portions of the network locations are available at the computing device.

14. A method as described in claim 10, wherein the multicast is performed as a network multicast that leverages infrastructure of the network to perform the multicasting of individual packets for receipt by a plurality of said computing devices.

15. A method as described in claim 10, wherein the multicast is performed via a peer-to-peer network or a mesh network.

16. A computing device comprising:
one or more modules implemented at least partially in hardware including a processing system and computer-readable storage media, the one or more modules configured to perform operations comprising:
displaying primary content received via a multicast stream;
exposing one or more controls that are selectable by a user to initiate one or more inputs to navigate content received via a multicast stream; and
responsive to receipt of the inputs to navigate the content received via the multicast stream:
identifying a point in time in the output of the content that corresponds to the navigation, the identifying performed concurrently during the displaying of the primary content;
locating a single dedicated stream that corresponds to the identified point in time;
obtaining the single dedicated stream for output concurrently during the displaying of the primary content received via the multicast stream as the multicast stream is received;
displaying the single dedicated stream; and
reducing network bandwidth consumption of the multicast stream during the displaying of the single dedicated stream.

17. A computing device as described in claim 16, further comprising
locating a multicast stream to be output subsequent to the displaying of the single dedicated stream.

18. A computing device as described in claim 16, wherein the navigation is a fast forward, rewind, or slow motion playback.

19. A computing device as described in claim 16, wherein the navigation is to initiate the displaying of the content.

20. A computing device as described in claim 16, wherein the single dedicated stream is configured accordingly to a Hypertext Transfer Protocol (HTTP).

* * * * *